May 30, 1967

M. D. OSTERMANN ETAL 3,322,354

AGGREGATE PROCESSING PLANT

Filed March 18, 1964

INVENTORS
MILTON D. OSTERMANN
ALVIN C. OSTERMANN
BY
Merchant, Merchant & Gould
ATTORNEYS May 30, 1967

M. D. OSTERMANN ETAL
AGGREGATE PROCESSING PLANT 3,322,354

Filed March 18, 1964

INVENTORS
MILTON D. OSTERMANN
ALVIN C. OSTERMANN
BY
Merchant, Merchant + Gould
ATTORNEYS

United States Patent Office 3,322,354
Patented May 30, 1967

3,322,354
AGGREGATE PROCESSING PLANT
Milton D. Ostermann and Alvin C. Ostermann, both of Turtle Lake, Wis. 54889
Filed Mar. 18, 1964, Ser. No. 352,808
8 Claims. (Cl. 241—81)

This invention relates generally to machinery and equipment for processing gravel and other aggregates, and more particularly, it relates to an aggregate processing plant having a novel skimming screen assembly adapted to separate a portion of the finer particles from the aggregate material initially fed into the plant.

Since aggregate processing machinery is relatively expensive and represents a sizable investment, it is very desirable to operate such machinery and equipment at peak efficiency so that production may be increased to the optimum. Although scalping screens have been previously known, they have not, for various reasons, achieved their desired objective of increasing the aggregate output or capacity of the plant. With this in mind, an important object of the present invention is the provision of a skimming screen assembly for an aggregate processing plant disposed, arranged and vibrated in a novel manner to receive aggregate material fed into the plant and initially screen out the finer particles of the aggregate material.

The skimming screen assembly provided in accordance with the present invention generally includes a screen disposed in a declining position at the discharge end of the main feed conveyor with the declining screen connected to the main screen box for vibration therewith in the desired direction in order to separate the finer particles by a sheering action against the material gravitating down the declining skimming screen.

When processing aggregate material (particularly wet clay or silt-contaminated rock or gravel) with previously known types of plants or machinery, it often happens that such materials will cause a caking or floating mat of material on the screens of the main screen box or assembly which carries over into the crushing apparatus. This may cause a packing and clogging of the crushing apparatus so as to result in greatly reduced production. With this in mind, an important object of the present invention is the provision of an aggregate processing plant which includes a skimming screen assembly which, because of its novel design and arrangement, overcomes the previously noted problems characteristic of other types of aggregate processing plants. The skimming screen assembly removes a great portion of the finer particles of aggregate material initially fed into the plant so as to prevent the caking of material on the main screens and carry over into the roll or jaw crushing apparatus.

An important feature of this invention is the provision of a skimming screen which declines from the discharge end of the main feed conveyor and is connected to the main screen assembly for vibration therewith and in a direction providing a highly desirable skim screening action of a sheering nature.

Another object of this invention is the provision of a diverter plate structure disposed below the skimming screen for directing the material passing through the screen toward opposite sides of the main screen assembly, in combination with a pair of chutes at the opposite sides of the main screen assembly for bypassing the material passing through the skimming screen around the main screen assembly.

The above and still further objects and advantages of the present invention will become apparent from a consideration of the following detailed specification, attached claims and appended drawings.

Referring to the drawings, wherein like reference characters indicate like parts or elements throughout the several views.

Figures 1, 2:
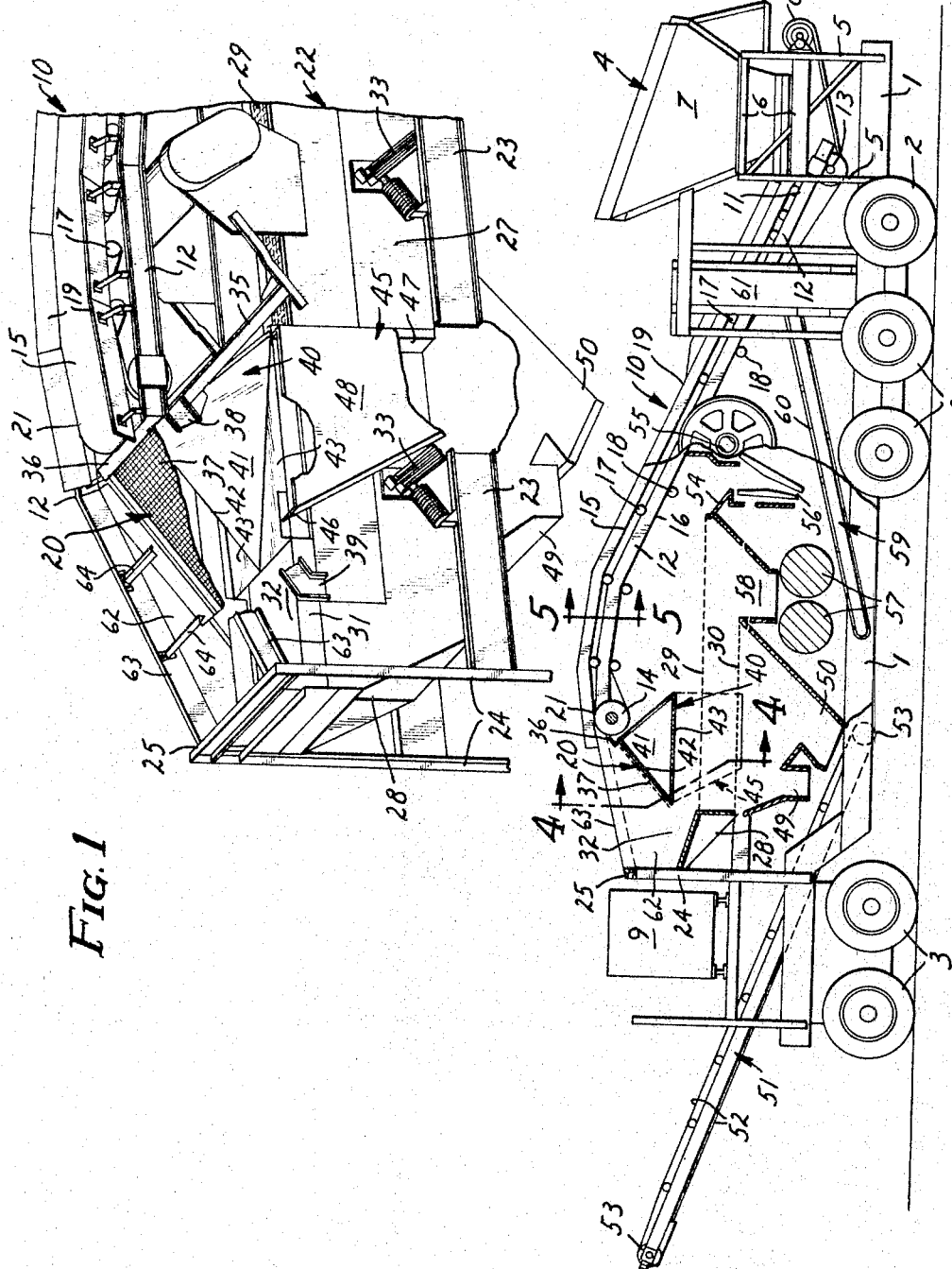
FIG. 1 is a view in perspective of a portion of an aggregate processing plant showing the skimming screen assembly of the present invention, some parts being broken away.
FIG. 2 is a view in elevation of the entire aggregate processing plant and also showing the skimming screen assembly, some parts being broken away.

Referring more particularly to the drawings, the aggregate processing plant shown therein comprises a frame structure including a pair of elongated longitudinally extending lower frame members 1. In order to render the processing plant portable, the lower frame members 1 are provided with a plurality of rear wheels 2 located adjacent the rear end portions thereof; and the front end portions of the frame members 1 carry a plurality of front wheels 3, it being noted that the terms "front" and "rear" are used herein for ease of description. A feeding hopper, represented generally by the reference numeral 4, is supported on the lower frame members 1 by means of a hopper frame structure which includes upstanding legs 5 and frame rails, as illustrated at 6 in FIG. 2. The feeding hopper 4 comprises upwardly and outwardly diverging side walls, as shown at 7 in FIG. 2, and the hopper 4 is of the reciprocating feeding type and includes a drive member 8. The drive member 8 of the hopper 4 is connected through suitable pulleys or other transmission means, not shown, to a power supply in the form of an internal combustion engine 9.

For the purpose of conveying aggregate material initially fed into the hopper 4, a main feeding conveyor, represented generally by the reference numeral 10, extends longitudinally forwardly from the hopper 4. The main feeding conveyor 10 also conveys the recirculated material, as noted hereinafter. One end portion 11 of the main conveyor 10 is positioned adjacent the bottom of the hopper 4 to receive aggregate material, such as gravel or the like, therefrom. The main conveyor 10 may be constructed in a conventional form with laterally spaced elongated frame members 12 rigidly secured to the frame of the plant. The main feeding conveyor 10 is in the form of an endless belt entrained around a head pulley 13 and a tail pulley 14, and the conveyor 10 is suitably driven by powering one of the pulleys 13, 14 through suitable driving or transmission mechanism connected to the engine 9.

Figure 4:
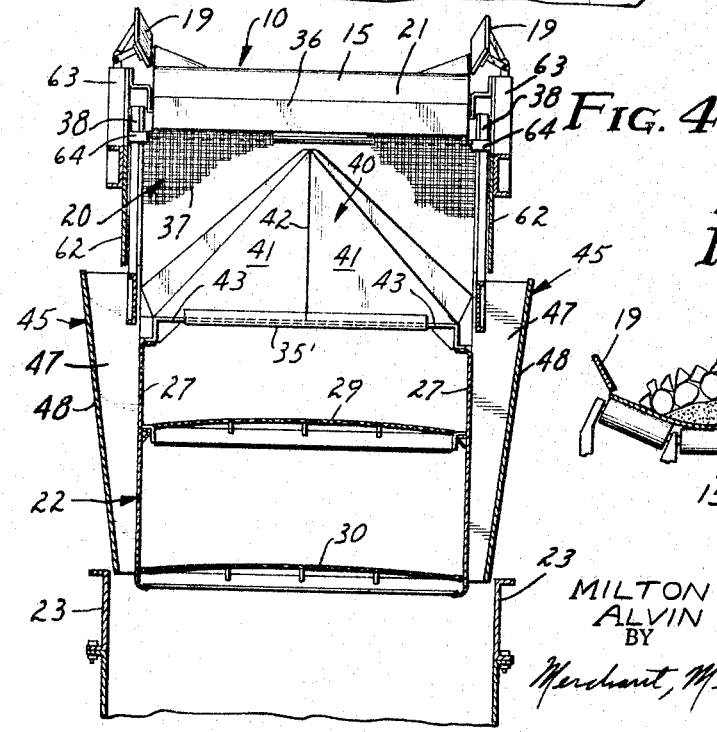
FIG. 4 is an enlarged view in transverse section taken generally on the line 4—4 of FIG. 2.
Figure 5:
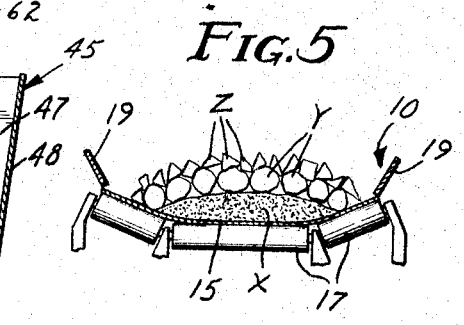
FIG. 5 is a view in transverse section taken across the main feeding conveyor on the line 5—5 of FIG. 2 and showing a typical stratification of the material in the conveyor.

The endless belt of the main feeding conveyor 10 is mounted to define an upper flight 15 and a lower flight 16. The upper flight 15 is supported upon upper troughing rollers 17, and lower return rollers 18 support the lower return flight 16. Upwardly and outwardly diverging guide rails 19 are provided for the upper flight 15 of the conveyor 10, as shown particularly in FIGS. 1, 4 and 5. FIG. 5 illustrates a typical stratification of the material on the conveyor 10 as it is delivered or expelled therefrom. By reason of the bumping on the troughing rollers 17, the finer particles X tend to stratify adjacent the bottom of the conveyor 10, with the larger material or rocks Y remaining near the top. The material reduced by the crushing apparatus and recirculated, as noted hereafter, is shown at Z.

In accordance with the present invention, a skimming screen assembly, represented generally by the reference numeral 20, is disposed adjacent and generally below the other end portion 21 of the main feeding conveyor 10 to receive material from the main conveyor 10 and separate the finer particles from the aggregate material. The skimming screen assembly 20 is disposed generally above a main screen box or assembly, represented generally by the reference numeral 22. As shown particularly in FIGS. 1, 3 and 4, the main screen box or assembly 22 is supported by a pair of spaced longitudinally extending frame members 23 specifically constructed from structural channel iron or the like. The frame structure further comprises a pair of upstanding posts 24 which extend upwardly from the lower frame members 1 with an upper cross member 25 connected between the upper end portions of the posts 24. The main screen box or assembly 22 may be of the type shown in U.S. Patent No. 2,312,477, by Harold C. Pollitz, entitled "Vibrating Screen." For ease of reference herein, it will be noted that the main screen box or assembly 22 comprises spaced side plates 27 and an irregular front wall 28. The main screen box 22 is of the multi-deck type and further comprises an upper deck or upper screen 29 and a lower deck or screen 30. It is noted that the decks or screens 29, 30 are of differing mesh sizes with the lower screen 30 being of a mesh size smaller than the upper screen 29, and the lower screen 30 is usually of a mesh size to pass aggregate particles of a desired finished size. The upper wall 31 of the main screen box 22 defines adjacent the front end portion thereof an inlet opening 32 adapted to receive the oversize material from the skimming screen assembly 20. The material discharging onto a baffle or feed box adjacent the front wall 28 where it is reversed onto the upper screen 29.

The main screen assembly 22 is suspended or floated with respect to the frame members 23 by means of a plurality of elongated leaf springs 33 which extend obliquely upwardly in one general direction. The main screen assembly 22, and the skimming screen assembly, are vibrated or reciprocated in another general direction extending obliquely and generally perpendicular to the extension of said springs 33 by means of an unbalanced exciting mechanism as disclosed in the above-noted U.S. Patent No. 2,312,477. The plane of vibrating action extends generally through the center of gravity of main screen assembly 22. The vibration of the declining screen 37 is in a direction generally parallel with the surface of the screen 37 to produce a sheering action against the material for separating the finer particles, shown as X in FIG. 5.

Figure 3:
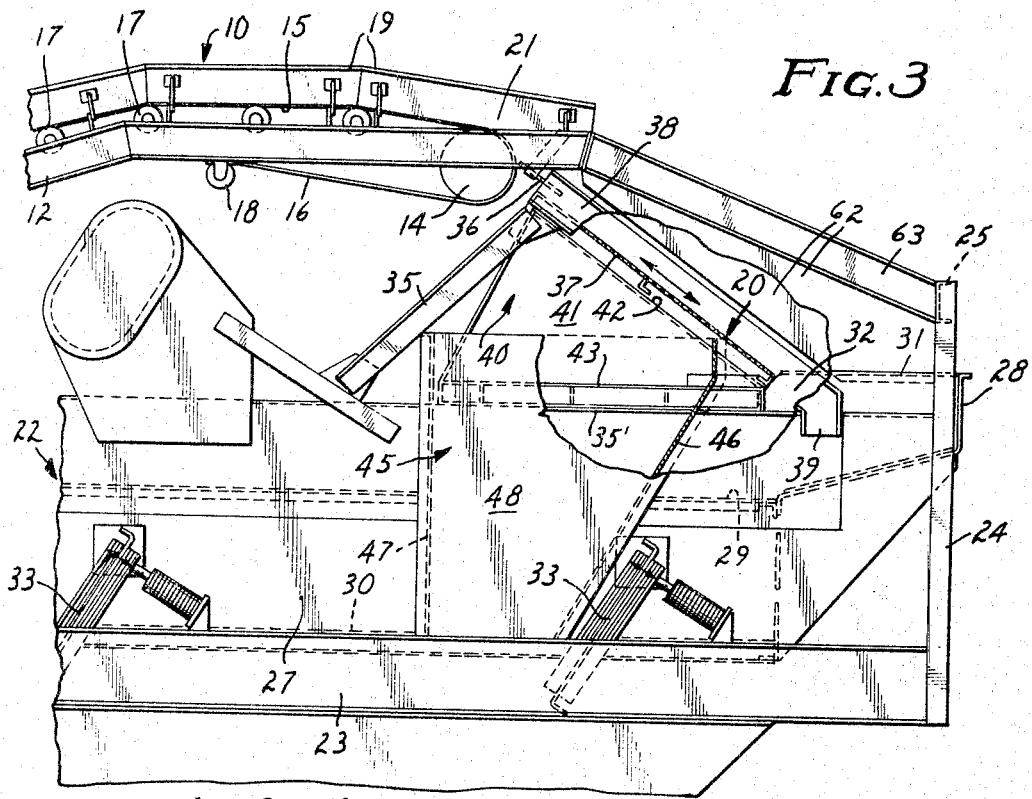
FIG. 3 is an enlarged view in side elevation showing a portion of the machine from the side opposite that shown in FIG. 2, some parts being broken away.

Referring more particularly to the skimming screen assembly 20, the same comprises an upwardly and rearwardly inclined screen 37 of the desired mesh size to separate the finer particles from the aggregate material. As shown in FIG. 3, the skimming screen 20 mounted in a declining position below the discharge end of the main conveyor 10 in general parallelism with the plane of vibrating action of the main screen assembly 22 and the skimming screen assembly 20. The inclined screen 37 is rigidly secured to the main screen box 22 for reciprocation or vibration therewith by means of a pair of upwardly and rearwardly extending frame arms 38, the lower end portions 39 of which are rigidly secured to the opposed side plates 27 of the main screen box 22, and also by means of bracing arms 35. As shown particularly in FIGS. 3 and 4, the declining screen 37 of the skimming screen assembly 20 is disposed immediately adjacent and below the delivery end portion 21 of the main conveyor 10 to receive the material delivered or expelled therefrom. It is noted that a flexible scraper 36 is carried by suitable brackets and interposed between the discharge end of the conveyor 10 and the declining screen 37.

The skimming screen assembly 20 further comprises a diverter plate structure, represented generally by the reference numeral 40, adapted to direct the aggregate material which passes through the declining screen 37 to the opposite sides of the skimming screen assembly 20. The diverter plate structure 40 comprises a pair of triangular diverter plates 41 positioned to extend upwardly and inwardly in a generally pyramidal form to meet along an upwardly and rearwardly inclined edge portion 42 which separates the material passing the screen 37 for flow down the opposite diverter plates 41. As shown particularly in FIG. 1, the diverter plate structure 40 further comprises a pair of generally triangular generally horizontal plates or flanges 43 which are connected with and extend outwardly from the bottom edges of the opposite diverter plates 41. As shown in FIG. 3 and FIG. 4, the diverter plate structure 40 is secured and mounted on the upper wall 35' of the main screen box 22 for vibration therewith.

As shown particularly in FIGS. 1 and 4, a pair of generally tubular chutes, each represented generally by the reference numeral 45, are mounted on the opposite side plates 27 of the main screen box 22 and depend generally from the opposite sides of the diverter structure. The chutes 45 are disposed to receive at their upper portions the material diverted by the diverter plate structure 40 and bypass the diverted material around the multi-deck main screen box or assembly 22. Each of the depending chutes 45 comprises a front wall 46, a back wall 47 and an outer side wall 48.

In accordance with present practices, the material of the desired finished size which passes the lower screen deck 30 of the main screen box 22 is deposited through one or the other of a front outlet 49 and a second outlet 50, both of which are generally funnel-shaped. The outlets 49, 50 discharge onto a delivery conveyor 51, as shown particularly in FIG. 2. The delivery conveyor 51 is conventional and includes an endless belt 52 mounted on drum-like head and tail pulleys 53. One of the drum pulleys 53 is driven by suitable mechanism, not shown, for elevating the material discharged from the outlets 49, 50 to a suitable storage hopper, bin or the like, not shown. It will be appreciated that in some instances of operation, the discharge of finer material from the front outlet 49 may be separated from the discharge from the second outlet 50, or vice versa, as may be desired.

As shown particularly in FIG. 2, the aggregate material which does not pass the upper screen 29 is discharged over the rear end portion 54 of the main screen box 22 where the same is processed by a conventional jaw crusher mechanism 55, the outlet of which is shown at 56. Similarly, the material which does not pass the lower screen deck 30 is discharged into a conventional roller crusher mechanism 57 through a funnel chute 58 secured to the frame 23 and disposed adjacent the rear end portion of the lower screen 30. The material which is then reduced or further processed by the jaw crusher mechanism 55 and the roller crusher mechanism 57 is discharged thereby onto a conventional undercrusher conveyor 59 having an endless belt 60. The material on the conveyor 59 is then returned to the main feeding conveyor 10 for recirculation by means of a conventional elevating wheel mechanism, shown generally at 61.

For the purpose of preventing the oversize material which does not pass the declining screen 37 of the skimming screen assembly 20 from bouncing off into the conveyor belts or other moving mechanism, a shield structure is provided. The shield structure comprises a pair of spaced shield plates 62 disposed generally on opposite sides of the skimming screen 37 and supported by inclined and elongated side frame members 63 and cross frame members 64.

Referring to the operation of the present invention, the aggregate material fed from the hopper 4 by the main feeding conveyor 10 deposits onto the declining screen 37 of the skimming screen assembly 20. The finer particles (X in FIG. 5) pass through the screen 37 by reason of their downward gravitation in combination with the vibrating sheering action of the declining screen and are diverted by the diverter plate structure 40 into the opposed depending side chutes 45. This material is then bypassed around the main screen box 22, as shown particularly in FIG. 4, where it may join the material which is passed through the lower screen deck 30 of the main screen assembly 22, as illustrated in FIG. 2, unless it is previously removed in a manner not shown. The combined material passing the declining screen 37 and the lower screen 30 is discharged by the outlets 49, 50 onto the conveyor 51. The oversize material which does not pass the declined skimming screen 37 falls through the inlet opening 32 into the feed box of the main screen box 22 where it is screened and processed in the conventional manner by the main screen assembly 22. The oversize material which does not pass the upper screen 29 is reduced by the jaw crusher mechanism 55, and the oversize material which does not pass the finer lower screen 30 is reduced by the roller crusher mechanism 57. Reduced material (Z in FIG. 5) discharged by both of the crushing mechanisms 55, 57 is elevated by the conveyor 59 and the elevating wheel 61 and deposited on top of the material already placed on the conveyor 10 by the hopper 4, where it is recirculated through the processing plant in the manner previously described.

It will be appreciated that a skimming screen assembly, disposed and vibrated in a novel manner, has been described, along with a novel diverter plate structure and bypass chute arrangement. This invention has been thoroughly tested and found to be satisfactory for the accomplishment of the above objects; and while a preferred embodiment, in which the principles of the present invention have been incorporated, has been shown and described herein, it should be specifically understood that the same may be modified without departure from the scope and spirit of the appended claims.

What we claim is:

1. In an aggregate processing plant having an elongated frame:
   (a) a feeding hopper attached to said frame and into which aggregate material of various size particles is fed,
   (b) a main screen assembly of the type including a plurality of generally horizontal screen elements floated with respect to said frame by means of a plurality of springs which extend obliquely upwardly in one direction and in which said screen assembly is vibrated in a direction extending obliquely upward and generally perpendicular to said one direction and with the plane of vibration action extending generally through the center of gravity of said screen assembly,
   (c) a main aggregate feeding conveyor extending outwardly from said hopper,
   (d) a skimming screen mounted in a declining position generally parallel with the direction of vibration of said main screen assembly below the discharge end of said conveyor to receive material therefrom, said skimming screen being connected to an upper portion of said main screen assembly for vibration therewith in the generally same obliquely upward direction so as to separate the finer particles therefrom by a sheering action of the screen against the material gravitating down said declining screen, and
   (e) the oversize material from said skimming screen passing into said main screen assembly for further processing.

2. In an aggregate processing plant having an elongated frame:
   (a) a feeding hopper attached to said frame and into which aggregate material of various size particles is fed,
   (b) a main screen assembly including at least one screen element floated for vibration with respect to said frame,
   (c) vibratory means mounted on said frame and attached to said main screen assembly for imparting vibratory movement to the screen element in a direction intersecting the plane of the screen element at an oblique angle thereto,
   (d) a main aggregate feeding conveyor extending outwardly from said hopper,
   (e) a skimming screen mounted in a declining position generally parallel with the direction of vibration of the screen element below the discharge end of said conveyor to receive material therefrom, said skimming screen being connected to an upper portion of said main screen assembly for vibration therewith in the generally same direction so as to separate the finer particles therefrom by a vibrating sheering action of the screen against the material gravitating down said declining screen, and
   (f) the oversize material from said skimming screen passing into said main screen assembly for further processing.

3. The structure defined in claim 2 in further combination with a diverter plate structure disposed below said skimming screen and adapted to direct the material passing the same to one side of said main assembly, and a generally tubular chute disposed generally at said one side of said main screen assembly and depending therefrom to bypass said main screen assembly and receive and conduct from said diverter plate structure the finer particles passing said skimming screen.

4. The structure defined in claim 2 in further combination with a diverter plate structure disposed below said skimming screen and adapted to direct the material passing said skimming screen to opposite sides of said main screen assembly, and a pair of spaced and generally tubular chutes disposed generally at the opposite sides of said main screen assembly and depending therefrom to bypass said main screen assembly and receive and conduct from said diverter plate structure the finer particles passing said skimming screen.

5. In an aggregate processing plant having an elongated frame:
   (a) a feeding hopper into which aggregate material of various size particles is fed,
   (b) a multi-deck main screen assembly floated for vibration with respect to said frame, said main screen assembly having vertically spaced screen decks of various mesh sizes which become smaller with each succeedingly lower deck and with the lowermost deck passing particles of a finished size,
   (c) vibratory means mounted on said frame and attached to said main screen assembly for imparting vibratory movement to said screen decks in a direction intersecting the plane of said screen decks at an oblique angle thereto,
   (d) a main aggregate feeding conveyor extending outwardly from said hopper,
   (e) a skimming screen mounted in a declining position generally parallel with the direction of vibration of said main screen assembly below the discharge end of said conveyor to receive material therefrom, said skimming screen being connected to an upper portion of said main screen assembly for vibration therewith in the generally same direction so as to separate the finer particles therefrom by a shearing action of the screen against material gravitating down said declining screen,
   (f) a diverter plate structure disposed below said skimming screen and adapted to direct the material passing through said skimming screen to opposite sides of said main screen assembly,
   (g) a pair of spaced and generally tubular chutes disposed at said opposite sides of said main screen assembly and depending therefrom to bypass said main screen assembly and receive and conduct from said diverter plate structure the finer particles passing through said skimming screen, (h) the oversize material from said skimming screen passing into said main screen assembly for further processing, (i) crushing apparatus for reducing the material not passed by the upper deck of said main screen assembly, (j) means for returning the material discharged from said crushing apparatus to said main conveyor for recirculation, and (k) a delivery conveyor for receiving the material of a finished size from said chutes and also from said lowermost deck of the main screen assembly.

6. In an aggregate processing plant having an elongated frame:

(a) a main screen assembly including at least one screen element mounted for vibration with respect to said frame;

(b) vibratory means mounted on said frame and attached to said main screen assembly for imparting vibratory movement to the screen element in a direction intersecting the plane of the screen element at an oblique angle thereto;

(c) a skimming screen disposed generally in a plane approximately parallel with the direction of vibration of the screen element and connected to an upper portion of said main screen assembly for vibration therewith, said skimming screen having openings therethrough of a size to separate the finer particles from an aggregate material;

(d) means for introducing an aggregate material of various size particles onto said skimming screen; and (e) said skimming screen being further positioned so that the finer particles separated thereby are directed to bypass the separating operation of the main screen assembly and the oversize material passes into said main screen assembly for further processing.

7. An aggregate processing plant as set forth in claim 6 wherein the means for introducing an aggregate material is positioned to feed the material onto the skimming screen approximately in the plane thereof.

8. An aggregate processing plant as set forth in claim 7 wherein the means for introducing an aggregate material includes a conveyor shaped to stratify the material so that the finer particles are generally adjacent the surface thereof.

References Cited
UNITED STATES PATENTS

| | | | |
|---|---|---|---|
| 2,019,547 | 11/1935 | Theobald | 209—326 |
| 2,107,729 | 2/1938 | Denovan | 209—314 |
| 2,225,909 | 12/1940 | Gruender | 209—311 |
| 2,276,333 | 3/1942 | Overstrud | 241—76 X |
| 2,343,270 | 3/1944 | Agnew | 241—76 X |
| 2,864,561 | 12/1958 | Mork | 241—76 X |
| 2,967,616 | 1/1961 | Philippbar | 209—317 X |
| 3,016,203 | 1/1962 | Sears | 241—76 X |
| 3,073,536 | 1/1963 | Quinn | 241—76 |
| 3,235,078 | 2/1966 | Hostetler | 209—315 |

WILLIAM W. DYER, Jr., *Primary Examiner.*

HARRY F. PEPPER, Jr., ROBERT C. RIORDON,
*Examiners.*